United States Patent [19]

Komatsu et al.

[11] Patent Number: 5,317,063
[45] Date of Patent: May 31, 1994

[54] WATER-SOLUBLE POLYMER SENSITIVE TO SALT

[75] Inventors: Masanori Komatsu, Narashino; Yasuo Iida, Yokohama, both of Japan

[73] Assignee: Lion Corporation, Tokyo, Japan

[21] Appl. No.: 656,755

[22] Filed: Feb. 19, 1991

[51] Int. Cl.$^5$ .................. C08F 220/06; C08F 220/12; C08F 8/44
[52] U.S. Cl. .......................... 525/330.2; 525/329.7; 525/330.1; 525/330.3; 525/360; 525/366; 525/367; 525/369; 525/374; 525/378; 525/379; 525/380; 526/317.1; 526/318.4; 526/326; 526/328.5
[58] Field of Search ................. 525/330.2, 330.3, 369, 525/378, 380

[56] References Cited

FOREIGN PATENT DOCUMENTS 0047009 3/1982 European Pat. Off. .
63-139906 11/1980 Japan .

OTHER PUBLICATIONS

Cram, D. J. & Hammond, G. S. "Organic Chemistry" 16 (1960) McGraw-Hill (New York).
Noller, C. R. "Textbook of Organic Chemistry", 2nd Ed., 575 (1958) Saunders (London).

*Primary Examiner*—Fred Zitomer
*Attorney, Agent, or Firm*—Burns, Doane, Swecker & Mathis

[57] ABSTRACT

A water-soluble polymer sensitive to salts is a copolymer of (A) 10 to 90% of acrylic acid and/or methacrylic acid; and (B) 90 to 10% of a vinyl monomer of Formula (I):

$$CH_2=\overset{R}{\underset{|}{C}}-COOR^1 \qquad (I)$$

(wherein R represents a hydrogen atom or a methyl group; and $R^1$ represents an aryl group or a cycloalkyl group); or the foregoing component (A); (B) 2 to 70% of a vinyl monomer of Formula (II):

$$CH_2=\overset{R}{\underset{|}{C}}-COOR^2 \qquad (II)$$

(wherein $R^2$ represents an alkyl group, an aryl group or a cycloalkyl group); and (C) 2 to 40% of a vinyl monomer of Formula (III):

$$CH_2=\overset{R}{\underset{|}{C}}-R^3 \qquad (III)$$

(wherein $R^3$ represents an aryl group), 2 to 70 mole % of the repeating units derived from the acrylic acid and/or methacrylic acid being in the form of a salt. It is soluble in tap water, but insoluble in an aqueous solution containing not less than 0.5% of an inorganic salt of a monovalent ion.

6 Claims, No Drawings

WATER-SOLUBLE POLYMER SENSITIVE TO SALT

BACKGROUND OF THE INVENTION

The present invention relates to a polymer whose solubility in water is changed depending on a very slight difference in the concentrations of a salt and more specifically to a water-soluble polymer which is soluble in the usual tap water, but is insoluble in an aqueous solution which contains not less than 0.5% by weight of a neutral inorganic salt comprising a monovalent ion such as NaCl, KCl and NaBr.

It has been known that when an inorganic salt as an electrolyte is added in an increasing amount to an aqueous solution of a water-soluble polymer, the polymer is precipitated out due to the salting-out phenomenon. On the other hand, it has also been known that salts are included in body fluids such as the human urine in an amount of not less than 0.5% by weight (the term "% by weight" will hereinafter be referred to as simply "%"). Under such circumstances, there has been developed a polymer which is soluble in tap water, but insoluble in an aqueous solution containing salts in an amount of not less than 0.5% and the polymer has been used as a barrier film which is insoluble in the body fluids, but soluble in tap water and capable of being thrown into the flush toilet. However, anionic polymers such as sodium salts of polyacrylate and carboxymethyl cellulose are less sensitive to an increase in the concentration of an electrolyte in an aqueous solution. Such anionic polymers become insoluble in, for instance, an aqueous solution of common salt having a concentration of 4 to 5% or higher. Moreover, non-ionic polymers such as hydroxyethyl cellulose and polyvinyl alcohol (PVA) are also soluble in such an aqueous salt solution up to a more higher salt concentration and, for making these non-ionic polymers insoluble in an aqueous solution, the concentration of the salt, for instance, common salt must be increased to about 10% or higher. Therefore, these polymers as such cannot be used for forming the foregoing liquid-tight film. For this reason, many investigations for solving these problems have been made. For instance, Japanese Patent Unexamined Publication (hereinafter referred to as "J. P. KOKAI") No. Sho 50-52371 discloses an alkali cellulose ether sulfate as a polymeric material whose solubility varies depending on the concentration of a salt in an aqueous solution. However, the difference between solubilities of the sulfate in tap water and in a 0.5% aqueous common salt solution is not clearly described in this patent. Moreover, the alkali cellulose ether sulfate is prepared by subjecting a cellulose derivative such as ethyl cellulose to sulfation and, therefore, the resulting polymer is relatively expensive.

As a means for solving the foregoing problems, J. P. KOKAI No. Sho 63-139906 discloses a partially neutralized copolymer of acrylic acid or methacrylic acid with an alkyl (meth)acrylate and it has been reported that this polymer is soluble in tap water, but insoluble in an aqueous solution of common salt having a concentration of not less than 0.5%. Although this polymer makes it possible to solve the foregoing problem, it has high adhesion and cannot be used in the form of a film or a binder since films are very sticky and are hence liable to adhere to one another.

SUMMARY OF THE INVENTION

Accordingly, the object of the present invention is to provide a polymer which is soluble in tap water, but insoluble in an aqueous solution containing 0.5% or more of a neutral inorganic salt comprised of a monovalent ion such include NaCl, KCl and NaBr and which is not sticky when it is formed into a film.

The present invention has been completed on the basis of the finding that the foregoing object can effectively be accomplished if acrylic acid and/or methacrylic acid are copolymerized with a specific aromatic ester monomer or a cycloalkyl ester monomer and then the resulting copolymer is partially neutralized to a predetermined level.

According to an aspect of the present invention, the foregoing object can effectively be achieved by providing a water-soluble polymer (a first polymer) sensitive to salts which is a copolymer of:

(A) 10 to 90% of acrylic acid and/or methacrylic acid; and
(B) 90 to 10% of a vinyl monomer represented by the following general formula (I):

(wherein R represents a hydrogen atom or a methyl group; and $R^1$ represents an aryl group or a cycloalkyl group), and in which 2 to 70 mole % of the repeating units derived from the acrylic acid and/or methacrylic acid is in the form of a salt.

According to another aspect of the present invention, there is provided a water-soluble polymer (a second polymer) sensitive to salts which is a copolymer of:

(A) 10 to 90% of acrylic acid and/or methacrylic acid;
(B) 2 to 70% of a vinyl monomer represented by the following general formula (II):

(wherein R represents a hydrogen atom or a methyl group; and $R^2$ represents an alkyl group, an aryl group or a cycloalkyl group); and
(C) 2 to 40% of a vinyl monomer represented by the following general formula (III):

(wherein R represents a hydrogen atom or a methyl group; and $R^3$ represents an aryl group), and in which 2 to 70 mole % of the repeating units derived from the acrylic acid and/or methacrylic acid is in the form of a salt.

DESCRIPTION OF THE PREFERRED EMBODIMENTS

The water-soluble polymers sensitive to salts of the present invention will hereunder be explained in more detail.

If $R^1$ is an aryl group in the monomer represented by Formula (I), the aryl group has 6 to 15, preferably 6 to 12 carbon atoms (the group includes an aralkyl group having 7 to 19 carbon atoms). Specific examples thereof are phenyl, benzyl, 2-phenoxyethyl, p-methylbenzyl and p-hydroxybenzyl and particularly preferred monomers of Formula (I) in which $R^1$ is an aryl group are, for instance, benzyl (meth) acrylates and 2-phenoxyethyl (meth)acrylates.

Moreover, if $R^1$ in Formula (I) is a cycloalkyl group, the cycloalkyl group has 4 to 15 carbon atoms, preferably 5 to 12 carbon atoms. Specific examples thereof include cyclohexyl, cyclopentyl, cyclododecyl and 2-methylcyclohexyl groups. Particularly preferred monomers of Formula (I) in which $R^1$ is a cycloalkyl group are cyclohexyl (meth)acrylate and cyclopentyl (meth)acrylate.

In the first polymer, the amount of the component (A) ranges from 10 to 90% and preferably 20 to 70%, while that of the component (B) ranges from 90 to 10% and preferably 80 to 30%. This is because, if the amount of the component (B) exceeds 90%, the resulting polymer is not soluble in tap water, while if it is less than 10%, the resulting polymer also dissolves in an aqueous solution containing 0.5% of a salt, in other words the polymer is not sensitive to salts.

Upon synthesizing the polymer sensitive to salts according to the present invention through the copolymerization of the components (A) and (B), other monomers may be copolymerized with these monomers (A) and (B) so long as they do not adversely affect the quality of the resulting polymer. Examples of such other monomers include butyl (meth)acrylate and 2-ethylhexyl (meth)acrylate.

In the monomer represented by Formula (II) which constitutes one of the structural units of the second polymer, $R^2$ represents an alkyl group having 1 to 15, preferably 2 to 8 carbon atoms, an aryl group having 6 to 19, preferably 6 to 12 carbon atoms, or a cycloalkyl group having 4 to 15, preferably 5 to 12 carbon atoms. Specific examples thereof include methyl, ethyl, butyl, 2-ethylhexyl, phenyl, benzyl, 2-phenoxyethyl, p-methylbenzyl, p-hydroxybenzyl, cyclohexyl, cyclopentyl and cyclododecyl groups. Examples of preferred monomers represented by Formula (II) are butyl (meth)acrylate, 2-ethylhexyl (meth)acrylate, phenyl (meth)acrylate, benzyl (meth)acrylate, 2-phenoxyethyl (meth)acrylate, cyclohexyl (meth)acrylate and cyclopentyl (meth)acrylate.

In the monomer represented by Formula (III) which constitutes one of the structural units of the second polymer, $R^3$ represents an aryl group having 6 to 19, preferably 6 to 13 carbon atoms and specific examples thereof are phenyl group and substituted phenyl groups such as methylphenyl group and p-ethylphenyl group. Specific examples of such monomers include styrene, α-methylstyrene, o-methylstyrene, dimethylstyrene and p-ethylstyrene and in particular styrene, α-methylstyrene and o-methylstyrene are preferably used.

In the second polymer, the amount of the component (A) ranges from 10 to 90% and preferably 20 to 70%; that of the component (B) ranges from 70 to 2% and preferably 60 to 5%; and that of the component (C) ranges from 2 to 40% and preferably 4 to 30%. This is because, if the amount of the component (B) exceeds 70%, the resulting second polymer is not soluble in tap water, while if it is less than 2%, the resulting polymer also dissolves in an aqueous solution containing 0.5% of a salt, in other words, the polymer is not sensitive to salts.

In addition, if the amount of the component (C) exceeds 40%, the film-forming ability of the resulting polymer is impaired and the adhesion thereof becomes too low to use it as a variety of binders, while if it is less than 2%, the stickiness of the polymer cannot be sufficiently improved. The copolymerization of these components (A), (B) and (C) may be performed in the coexistence of other monomers so long as they do not adversely affect the quality of the resulting polymer. Examples of such other monomers are the same as those listed above in connection with the first polymer.

In the first and second polymers of the present invention, it is essential to neutralize 2 to 70 mole %, preferably 5 to 65% and more preferably 5 to 50% of the structural units derived from acrylic acid and/or methacrylic acid in the copolymer into their salt form. This is because, if the rate of neutralization is less than 2 mole %, the resulting polymer is not soluble even in water, while if it exceeds 70 mole %, the polymer can also be dissolved in water containing 0.5% of a salt. The neutralization method is not restricted to a specific one and thus the neutralization may be performed after copolymerization of the foregoing components or these monomers may be neutralized prior to the copolymerization.

The neutralization is performed with an alkali. Examples of such alkalis include inorganic hydroxides such as sodium hydroxide, potassium hydroxide and lithium hydroxide; inorganic salts such as sodium carbonate; and amines such as monoethanolamine, diethanolamine, triethanolamine, diethylaminoethanol, ammonia, trimethylamine, triethylamine, tripropylamine and morpholine as well as any combination thereof. Preferred examples thereof are ethanolamines, sodium hydroxide or a combination of potassium hydroxide with an ethanolamine.

The polymers of the present invention must fulfill the foregoing requirements. Furthermore, desirably they have an average molecular weight ranging from 10,000 to 1,500,000 and preferably 20,000 to 500,000.

The polymers of the present invention can be prepared according to a variety of polymerization methods, preferably a solution polymerization method. Examples of polymerization solvents are lower alcohols such as methanol, ethanol and 2-propanol; a mixed solvent of water with a lower alcohol such as those listed above and a mixed solvent of water with a lower ketone such as acetone or methyl ethyl ketone. When a mixed solvent containing water is employed, the amount of water in the mixed solvent ranges from 10 to 70% and preferably 30 to 50%.

In the polymerization, a polymerization initiator is in general used. The polymerization initiator used in the invention is not restricted to a specific one and typical examples thereof include 2,2'-azobisisobutyronitrile, 2,2'-azobis(2-methylbutyronitrile), 2,2'-azobis(2,4-dimethylvaleronitrile), 2,2'-azobis(2-amidinopropane). dihydrochloride, 2,2'-azobis(N,N'-dimethyleneisobutylamidine), potassium persulfate, ammonium persulfate and aqueous hydrogen peroxide. The amount of these polymerization initiator ranges from 0.02 to 5% on the basis of the amount of the monomers.

The polymerization temperature varies depending on the kinds of the polymerization solvents used, but in general ranges from 50° to 90° C. and the polymerization time generally ranges from 3 to 8 hours.

According to the present invention, there can be provided polymers which are soluble in tap water, but insoluble in an aqueous solution containing 0.5% or more of a neutral inorganic salt comprising a monovalent ion and the polymers do not have stickiness unlike the conventional polymers of this type as has been discussed above in detail. Therefore, these polymers of this invention can effectively provide films having no stickiness and a variety of binders.

The polymers obtained by the present invention can be used in the form of a solution as such or can be formed into films by evaporating the solvent. Therefore, they can be used as materials for forming goods which come in contact with a variety of body fluids such as urine and blood. Upon using same, they can prevent the exudation of these body fluids and the used goods can be thrown into the flush toilet. Examples of such applications are binders of non-woven fabric such as paper diaper, sanitary goods and surgical bandages and barrier films for use in paper diaper and sanitary goods.

The water-soluble polymers sensitive to salts of the present invention will hereunder be explained in more detail with reference to the following non-limitative working Examples and the effects practically achieved by the present invention will also be discussed in detail below in comparison with Compatative Examples.

EXAMPLE 1

To a 500 ml four-necked separable flask provided with a stirring machine, a reflux condenser and a tube for introducing nitrogen gas, there were added 80 g of acrylic acid, 20 g of benzyl acrylate, 150 g of acetone and 35 g of deionized water for forming a uniform solution and then nitrogen gas was introduced into the flask through the nitrogen gas-introducing tube with stirring. After 20 minutes, there was added, to the solution, a solution of a polymerization initiator obtained by dissolving 0.1 g of 2,2'-azobis(2-amidinopropane). dihydrochloride in 5 g of deionized water to initiate the polymerization reaction in a water bath maintained at 70° C. The system was polymerized at 70° C. for 6 hours in a nitrogen gas stream, then cooled to room temperature and neutralized by adding a mixed solution comprising 4.6 g of a 48% aqueous solution of sodium hydroxide (rate of neutralization=5 mole % with respect to the acrylic acid), 60 g of deionized water and 240 g of ethanol. The solid content of the resulting polymer solution as determined by a Kett moisture meter was found to be 16.1% and the polymer had a weight-average molecular weight of 370,000.

About 3 g of this polymer solution was poured into a region which was defined by enclosing a part of the surface of a polyethylene plate placed on a horizontal base with silicone rubber and which had a size of 10 cm square, allowed to stand under constant temperature and humidity conditions of 25° C. and 50% RH for 2 days to form a film. The thickness of the resulting film varied depending on every portions to be determined, but fell within the range of from 35 to 50 μm.

EXAMPLE 2

A polymer film was prepared in the same manner used in Example 1 except that 50 g of acrylic acid, 50 g of benzyl acrylate and 11.6 g of a 48% aqueous solution of sodium hydroxide (rate of neutralization =20 mole % with respect to the acrylic acid) were used. The polymer had a weight-average molecular weight of 330,000.

COMPARATIVE EXAMPLE 1

A polymer film was prepared in the same manner used in Example 1 except that 50 g of acrylic acid, 50 g of benzyl acrylate and 52.1 g of a 48% aqueous solution of sodium hydroxide (rate of neutralization =90 mole % with respect to the acrylic acid) were used. The polymer had a weight-average molecular weight of 330,000.

EXAMPLE 3

A polymer film was prepared in the same manner used in Example 1 except that 30 g of acrylic acid, 70 g of benzyl acrylate and 15.6 g of a 48% aqueous solution of sodium hydroxide (rate of neutralization =45 mole % with respect to the acrylic acid) were used. The polymer had a weight-average molecular weight of 280,000.

COMPARATIVE EXAMPLE 2

A polymer film was prepared in the same manner used in Example 1 except that 30 g of acrylic acid, 70 g of benzyl acrylate and 0.3 g of a 48% aqueous solution of sodium hydroxide (rate of neutralization =1 mole % with respect to the acrylic acid) were used. The polymer had a weight-average molecular weight of 280,000.

COMPARATIVE EXAMPLE 3

A polymer film was prepared in the same manner used in Example 1 except that 95 g of acrylic acid, 5 g of benzyl acrylate and 5.5 g of a 48% aqueous solution of sodium hydroxide (rate of neutralization=5 mole % with respect to the acrylic acid) were used. The polymer had a weight-average molecular weight of 380,000.

COMPARATIVE EXAMPLE 4

A polymer film was prepared in the same manner used in Example 1 except that 5 g of acrylic acid, 95 g of benzyl acrylate and 3.8 g of a 48% aqueous solution of sodium hydroxide (rate of neutralization =65 mole % with respect to the acrylic acid) were used. The polymer had a weight-average molecular weight of 190,000.

EXAMPLE 4

A polymer film was prepared in the same manner used in Example 1 except that 60 g of acrylic acid, 15 g of butyl acrylate, 25 g of benzyl acrylate and 10.4 g of a 48% aqueous solution of sodium hydroxide (rate of neutralization=15 mole % with respect to the acrylic acid) were used. The polymer had a weight-average molecular weight of 370,000.

COMPARATIVE EXAMPLE 5

A polymer film was prepared in the same manner used in Example 1 except that 60 g of acrylic acid, 40 g of 2-ethylhexyl acrylate and 6.9 g of a 48% aqueous solution of sodium hydroxide (rate of neutralization=10 mole % with respect to the acrylic acid) were used.

The polymer had a weight-average molecular weight of 360,000.

TEST METHOD FOR DETERMINING SOLUBILITY OF POLYMERS

The resulting polymer film (about 0.1 g) was cut into a piece of 5 mm square, introduced into a 40 ml volume bottle of styrol resin, followed by addition of 20 g of tap water or a 0.9% common salt solution, stirring with a magnetic stirrer at room temperature and measurement of time required till the polymer piece was completely dissolved. In this respect, when the polymer piece was not completely dissolved within 3 hours, it was concluded that the polymer would be insoluble. The results obtained are summarized in the following Table-1. In this test, the tap water used was prepared by dissolving calcium chloride and sodium chloride in deionized water so that the amounts thereof were 60 mg/l and 120 mg/l respectively.

TEST METHOD FOR DETERMINING STICKINESS OF POLYMERS

A film formed according to the procedures as detailed above was allowed to stand under constant temperature and humidity conditions of 25° C. and 65% RH for 3 hours or more to control the moisture-content of the film, placed on a plane table and was strongly pressed with a thumb to determine the stickiness of the film according to a sensory test. The stickiness was evaluated on the basis of the following three-evaluation criteria:
○: not sticky
Δ: slightly sticky
X: sticky The results thus obtained are summarized in the following Table-1. Each abbreviation is as follows:
AAc : acrylic acid
BzA : benzyl acrylate
BA : butyl acrylate
2EHA : 2-ethylhexyl acrylate
MAc : Methacrylic acid

TABLE 1

| Film | Copolymer Composition (wt %) | Rate of Neutralization/AAc (mole %) | Solubility (min) Tap Water | Solubility (min) 0.9% NaCl | Stickiness |
|---|---|---|---|---|---|
| Ex. 1 | AAc/BzA = 80/20 | 5 | 15 | insoluble | ○ |
| Ex. 2 | AAc/BzA = 50/50 | 20 | 20 | insoluble | ○ |
| Comp. Ex. 1 | AAc/BzA = 50/50 | 90 | 4 | 30 | Δ |
| Ex. 3 | AAc/BzA = 30/70 | 45 | 50 | insoluble | ○ |
| Comp. Ex. 2 | AAc/BzA = 30/70 | 1 | insoluble | insoluble | ○ |
| Comp. Ex. 3 | AAc/BzA = 95/5 | 5 | 5 | 20 | Δ |
| Comp. Ex. 4 | AAc/BzA = 5/95 | 65 | insoluble | insoluble | ○ |
| Ex. 4 | AAc/BzA/Ba = 60/25/15 | 15 | 60 | insoluble | ○ |
| Comp. Ex. 5 | AAc/2EHA = 60/40 | 10 | 30 | insoluble | X |

EXAMPLE 5

To a 500 ml four-necked separable flask provided with a stirring machine, a reflux condenser and a tube for introducing nitrogen gas, there were added 45 g of acrylic acid, 55 g of cyclohexyl acrylate, 90 g of ethanol and 60 g of deionized water for forming a uniform solution and then nitrogen gas was introduced into the flask through the nitrogen gas-introducing tube with stirring. After 20 minutes, there was added, to the solution, a solution of a polymerization initiator obtained by dissolving 50 mg of 2,2'-azobis(2,4-dimethylvaleronitrile) in 5 g of ethanol to initiate the polymerization reaction in a water bath maintained at 80° C. The system was polymerized at 70° C. for 6 hours in a nitrogen gas stream, then cooled to room temperature and neutralized by adding 18 g of a 48% aqueous solution of sodium hydroxide (rate of neutralization=35 mole % with respect to the acrylic acid) and 400 g of deionized water. The polymer had a weight-average molecular weight of 55,000.

The solid content of the resulting polymer solution as determined by a Kett moisture meter was found to be 15.2%. About 3 g of this polymer solution was poured into a region which was defined by enclosing a part of the surface of a polyethylene plate placed on a horizontal base with silicone rubber and which had a size of 10 cm square, allowed to stand under constant temperature and humidity conditions of 25° C. and 50% RH for 2 days to form a film. The thickness of the resulting film varied depending on every portions to be determined, but fell within the range of from 30 to 50 μm.

EXAMPLE 6

A polymer film was prepared in the same manner used in Example 5 except that 70 g of acrylic acid, 30 g of cyclohexyl acrylate and 8.1 g of a 48% aqueous solution of sodium hydroxide (rate of neutralization=10 mole % with respect to the acrylic acid) were used.

The polymer had a weight-average molecular weight of 60,000.

EXAMPLE 7

A polymer film was prepared in the same manner used in Example 5 except that 60 g of acrylic acid, 15 g of butyl acrylate, 25 g of cyclohexyl acrylate and 10.5 g of a 48% aqueous solution of sodium hydroxide (rate of neutralization=15 mole % with respect to the acrylic acid) were used. The polymer had a weight-average molecular weight of 60,000.

EXAMPLE 8

A polymer film was prepared in the same manner used in Example 5 except that 30 g of acrylic acid, 70 g of cyclohexyl acrylate and 15.6 g of a 48% aqueous solution of sodium hydroxide (rate of neutralization=45 mole % with respect to the acrylic acid) were used. The polymer had a weight-average molecular weight of 40,000.

EXAMPLE 9

A polymer film was prepared in the same manner used in Example 5 except that 55 g of acrylic acid, 25 g of methacrylic acid, 20 g of cyclohexyl acrylate and 26 g of a 48% aqueous solution of sodium hydroxide (rate of neutralization=30 mol %) were used. The polymer had a weight-average molecular weight of 50,000.

The same tests performed in Example 1 were likewise carried out using the polymer films obtained in Examples 5 to 8. The results obtained are summarized in the following Table-2. In Table-2, the abbreviation "CHA" means cyclohexyl acrylate.

TABLE 2

| Film | Copolymer Composition (wt %) | Rate of Neutralization/AAc (mole %) | Solubility (min) Tap Water | Solubility (min) 0.9% NaCl | Stickiness |
|---|---|---|---|---|---|
| Ex. 5 | AAc/CHA = 45/55 | 35 | 10 | insoluble | ○ |
| Ex. 6 | AAc/CHA = 70/30 | 10 | 5 | insoluble | ○ |
| Ex. 7 | AAc/BA/CHA = 60/15/25 | 15 | 30 | insoluble | ○ |
| Ex. 8 | AAc/CHA = 30/70 | 45 | 30 | insoluble | ○ |
| Ex. 9 | AAc/MAc/CHA = 55/25/20 | 30 | 60 | insoluble | ○ |

EXAMPLE 10

To a 500 ml four-necked separable flask provided with a stirring machine, a reflux condenser and a tube for introducing nitrogen gas, there were added 70 g of acrylic acid, 20 g of 2-ethylhexyl acrylate, 10 g of styrene, 150 g of acetone and 35 g of deionized water for forming a uniform solution and then nitrogen gas was introduced into the flask through the nitrogen gas-introducing tube with stirring. After 20 minutes, there was added, to the solution, a solution of a polymerization initiator obtained by dissolving 0.1 g of 2,2'-azobis(2-amidinopropane).dihydrochloride in 5 g of deionized water to initiate the polymerization reaction in a water bath maintained at 70° C. The system was polymerized at 70° C. for 6 hours in a nitrogen gas stream, then cooled to room temperature and neutralized by adding a mixed solution comprising 8.1 g of a 48% aqueous solution of sodium hydroxide (rate of neutralization=10 mole % with respect to the acrylic acid), 60 g of deionized water and 240 g of ethanol. The solid content of the resulting polymer solution as determined by a Kett moisture meter was found to be 15.8%. The polymer had a weight-average molecular weight of 300,000.

About 3 g of this polymer solution was poured into a region which was defined by enclosing a part of the surface of a polyethylene plate placed on a horizontal base with silicone rubber and which had a size of 10 cm square, allowed to stand under constant temperature and humidity conditions of 25° C. and 50% RH for 2 days to form a film. The thickness of the resulting film varied depending on every portions to be determined, but fell within the range of from 35 to 50 μm.

COMPARATIVE EXAMPLE 6

A polymer film was prepared in the same manner used in Example 10 except that 0.8 g of a 48% aqueous solution of sodium hydroxide (rate of neutralization=1 mole % with respect to the acrylic acid) was used. The polymer had a weight-average molecular weight of 300,000.

COMPARATIVE EXAMPLE 7

A polymer film was prepared in the same manner used in Example 10 except that 64.8 g of a 48% aqueous solution of sodium hydroxide (rate of neutralization=80 mole % with respect to the acrylic acid) was used. The polymer had a weight-average molecular weight of 300,000.

EXAMPLE 11

A polymer film was prepared in the same manner used in Example 10 except that 40 g of acrylic acid, 50 g of butyl acrylate, 10 g of α-methylstyrene and 16.2 g of a 48% aqueous solution of sodium hydroxide (rate of neutralization=35 mole % with respect to the acrylic acid) were used. The polymer had a weight-average molecular weight of 270,000.

EXAMPLE 12

A polymer film was prepared in the same manner used in Example 10 except that 50 g of acrylic acid, 30 g of butyl acrylate, 20 g of styrene and 26.0 g of a 48% aqueous solution of sodium hydroxide (rate of neutralization=45 mole % with respect to the acrylic acid) were used. The polymer had a weight-average molecular weight of 330,000.

COMPARATIVE EXAMPLE 8

A polymer film was prepared in the same manner used in Example 10 except that 50 g of acrylic acid, 49 g of butyl acrylate, 1 g of styrene and 14.5 g of a 48% aqueous solution of sodium hydroxide (rate of neutralization=25 mole % with respect to the acrylic acid) were used. The polymer had a weight-average molecular weight of 320,000.

COMPARATIVE EXAMPLE 9

A polymer film was prepared in the same manner used in Example 10 except that 50 g of acrylic acid, 5 g of butyl acrylate, 45 g of styrene and 29.0 g of a 48% aqueous solution of sodium hydroxide (rate of neutralization=50 mole % with respect to the acrylic acid) were used. The polymer had a weight-average molecular weight of 360,000.

COMPARATIVE EXAMPLE 10

A polymer film was prepared in the same manner used in Example 10 except that 95 g of acrylic acid, 3 g of 2-ethylhexyl acrylate, 2 g of styrene and 5.5 g of a 48% aqueous solution of sodium hydroxide (rate of neutralization=5 mole % with respect to the acrylic acid) were used. The polymer had a weight-average molecular weight of 370,000.

COMPARATIVE EXAMPLE 11

A polymer film was prepared in the same manner used in Example 10 except that 5 g of acrylic acid, 65 g of benzyl acrylate, 30 g of styrene and 3.8 g of a 48% aqueous solution of sodium hydroxide (rate of neutralization=65 mole % with respect to the acrylic acid) were used. The polymer had a weight-average molecular weight of 140,000.

COMPARATIVE EXAMPLE 12

A polymer film was prepared in the same manner used in Example 10 except that 15 g of acrylic acid, 80 g of 2-ethylhexyl acrylate, 5 g of styrene and 12.2 g of a 48% aqueous solution of sodium hydroxide (rate of neutralization=70 mole % with respect to the acrylic acid) were used. The polymer had a weight-average molecular weight of 100,000.

EXAMPLE 13

A polymer film was prepared in the same manner used in Example 10 except that 60 g of methacrylic acid, 30 g of 2-ethylhexyl acrylate, 10 g of styrene and 17.4 g of a 48% aqueous solution of sodium hydroxide (rate of neutralization=30 mole % with respect to the acrylic acid) were used. The polymer had a weight-average molecular weight of 310,000.

EXAMPLE 14

A polymer film was prepared in the same manner used in Example 10 except that 60 g of acrylic-acid, 35 g of benzyl acrylate, 5 g of styrene and 17.4 g of a 48% aqueous solution of sodium hydroxide (rate of neutralization=25 mole % with respect to the acrylic acid) were used. The polymer had a weight-average molecular weight of 350,000.

EXAMPLE 15

A polymer film was prepared in the same manner used in Example 9 except that 60 g of acrylic acid, 35 g of cyclohexyl acrylate, 5 g of styrene and 17.4 g of a 48% aqueous solution of sodium hydroxide (rate of neutralization=25 mole % with respect to the acrylic acid) were used. The polymer had a weight-average molecular weight of 330,000.

The same tests performed in Example 1 were likewise carried out using the polymer films obtained in Examples 10 to 15 and Comparative Examples 6 to 12. The results obtained are summarized in the following Table-3. In Table-3, the abbreviations "α-MSt" and "St" mean α-methylstyrene and styrene, respectively.

What is claimed is:

1. A water-soluble polymer which is soluble in tap water, but insoluble in an aqueous solution containing 0.5% or more of a neutral inorganic salt, which is a copolymer of:
   (A) 10 to 90% by weight of acrylic acid and/or methacrylic acid; and
   (B) 90 to 10% by weight of a vinyl monomer represented by the following general formula (I):

$$CH_2=\underset{\underset{R}{|}}{C}-COOR^1 \qquad (I)$$

(wherein R represents a hydrogen atom or a methyl group; and $R^1$ represents an aryl group or a cycloalkyl group), and in which 5 to 50 mole % of the repeating units derived from the acrylic acid and/or methacrylic acid is in the form of a salt.

2. The water-soluble polymer of claim 1 wherein $R^1$ of Formula (I) represents an aryl group having 6 to 15, an aralkyl group having 7 to 19 carbon atoms or a cycloalkyl group having 4 to 15 carbon atoms.

3. The water-soluble polymer of claim 2 wherein $R^1$ of Formula (I) represents an aryl group having 6 to 12 carbon atoms, an aralkyl group having 7 to 19 carbon atoms or a cycloalkyl group having 5 to 12 carbon atoms.

4. The water-soluble polymer of claim 3 wherein $R^1$ of Formula (I) represents a phenyl group, a 2-phenoxyethyl group, a p-methylbenzyl group, a p-hydroxybenzyl group, a cyclohexyl group, a cyclopentyl group, a cyclododecyl group or a 2-methylcyclohexyl group.

5. The water-soluble polymer of claim 1 wherein the monomer of Formula (I) is at least one member selected from the group consisting of benzyl (meth)acrylates, 2-phenoxyethyl (meth)acrylates, cyclohexyl (meth)acrylates and cyclopentyl (meth) acrylates.

6. The water-soluble polymer of claim 1 wherein the amount of the component (A) ranges from 20 to 70% by weight and that of the component (B) ranges from 80 to 30% by weight.

* * * * *

TABLE 3

| Film | Copolymer Composition (wt %) | Rate of Neutralization/AAc (mole %) | Solubility (min) | | Stickiness |
|---|---|---|---|---|---|
| | | | Tap Water | 0.9% NaCl | |
| Ex. 10 | AAc/2EHA/St = 70/20/10 | 10 | 10 | insoluble | ◯ |
| Comp. Ex. 6 | AAc/2EHA/St = 70/20/10 | 1 | insoluble | insoluble | ◯ |
| Comp. Ex. 7 | AAc/2EHA/St = 70/20/10 | 80 | 5 | 15 | △ |
| Ex. 11 | AAc/BA/α-MSt = 40/50/10 | 35 | 120 | insoluble | ◯ |
| Ex. 12 | AAc/BA/St = 50/30/20 | 45 | 70 | insoluble | ◯ |
| Comp. Ex. 8 | AAc/BA/St = 50/49/1 | 25 | 50 | insoluble | X |
| Comp. Ex. 9 | AAc/BA/St = 50/5/45 | 50 | insoluble | insoluble | ◯ |
| Comp. Ex. 10 | AAc/2EHA/St = 95/3/2 | 5 | 5 | 15 | △ |
| Comp. Ex. 11 | AAc/BzA/St = 5/65/30 | 65 | insoluble | insoluble | ◯ |
| Comp. Ex. 12 | AAc/2EHA/St = 15/80/5 | 70 | 160 | insoluble | X |
| Ex. 13 | MAc/2EHA/St = 60/30/10 | 30 | 5 | insoluble | ◯ |
| Ex. 14 | AAc/BzA/St = 60/35/5 | 25 | 15 | insoluble | ◯ |
| Ex. 15 | AAc/CHA/St = 60/35/5 | 25 | 10 | insoluble | ◯ |